US009748668B2

(12) United States Patent
Wang et al.

(10) Patent No.: US 9,748,668 B2
(45) Date of Patent: Aug. 29, 2017

(54) DIVERSITY ANTENNA MODULE AND ASSOCIATED METHOD FOR A USER EQUIPMENT (UE) DEVICE (75) Inventors: Dong Wang, Waterloo (CA); Qinjiang Rao, Kanata (CA); James Warden, Ft. Worth, TX (US)

(73) Assignee: BlackBerry Limited, Waterloo, Ontario (CA)

(*) Notice: Subject to any disclaimer, the term of this patent is extended or adjusted under 35 U.S.C. 154(b) by 441 days.

(21) Appl. No.: 14/232,339

(22) PCT Filed: Jul. 15, 2011

(86) PCT No.: PCT/US2011/044117
§ 371 (c)(1),
(2), (4) Date: Jan. 13, 2014

(87) PCT Pub. No.: WO2013/012403
PCT Pub. Date: Jan. 24, 2013

(65) Prior Publication Data
US 2014/0132478 A1    May 15, 2014

(51) Int. Cl.
*H01Q 1/24*    (2006.01)
*H01Q 21/30*    (2006.01)
(Continued)

(52) U.S. Cl.
CPC ............ *H01Q 21/30* (2013.01); *H01Q 1/243* (2013.01); *H01Q 1/38* (2013.01);
(Continued)

(58) Field of Classification Search
CPC .......... H01Q 1/243; H01Q 1/38; H01Q 21/24; H01Q 21/0087; H01Q 21/30; H01Q 25/00; H04B 1/0064
(Continued)

(56) References Cited

U.S. PATENT DOCUMENTS

| 5,132,648 A | 7/1992 | Trinh et al. |
| 6,031,503 A | 2/2000 | Preiss, II et al. |

(Continued)

FOREIGN PATENT DOCUMENTS

| CA | 2727102 A1 | 7/2011 |
| EP | 1237225 A1 | 9/2002 |

(Continued)

OTHER PUBLICATIONS

EPO, Communication Pursuant to Rules 161(1) and 162 EPC, Application No. 11749963.2, Feb. 21, 2014, 2 pgs.
(Continued)

*Primary Examiner* — Khai M Nguyen
(74) *Attorney, Agent, or Firm* — Fish & Richardson P.C.

(57) ABSTRACT

A diversity antenna module comprising a first radiating element adapted to operate with a first transceiver circuit operating in at least one band and a second radiating element adapted to operate with a second transceiver circuit operating in at least one band. The first radiating element is disposed along a first side of a substrate and the second radiating element is disposed along a second side of the substrate, wherein the first and second sides are substantially perpendicular to each other, the first and second radiating elements being spatially dispersed from each another by a distance.

19 Claims, 9 Drawing Sheets (51) Int. Cl.
  *H01Q 1/38* (2006.01)
  *H01Q 21/24* (2006.01)
  *H01Q 25/00* (2006.01)
  *H01Q 21/00* (2006.01)
  *H04B 1/00* (2006.01)

(52) U.S. Cl.
  CPC ......... *H01Q 21/0087* (2013.01); *H01Q 21/24* (2013.01); *H01Q 25/00* (2013.01); *H04B 1/0064* (2013.01); *Y10T 29/49016* (2015.01)

(58) Field of Classification Search
  USPC ............................. 343/702, 846; 455/575.7
  See application file for complete search history.

(56) References Cited

U.S. PATENT DOCUMENTS

| | | | |
|---|---|---|---|
| 6,184,833 B1 | 2/2001 | Tran | |
| 6,204,819 B1 | 3/2001 | Hayes et al. | |
| 6,381,471 B1 | 4/2002 | Dvorkin | |
| 6,426,723 B1 * | 7/2002 | Smith | H01Q 1/22 343/700 MS |
| 6,448,932 B1 | 9/2002 | Stoiljkovic | |
| 6,664,930 B2 * | 12/2003 | Wen | H01Q 1/38 343/702 |
| 6,894,647 B2 * | 5/2005 | Jenwatanavet | H01Q 1/243 343/700 MS |
| 6,950,069 B2 * | 9/2005 | Gaucher | H01Q 1/24 343/700 MS |
| 7,023,387 B2 | 4/2006 | Wen et al. | |
| 7,072,690 B2 * | 7/2006 | Shin | G06F 1/1616 343/702 |
| 7,352,327 B2 | 4/2008 | Yeh et al. | |
| 7,369,092 B1 | 5/2008 | Wen et al. | |
| 7,415,295 B2 | 8/2008 | Tran | |
| 7,675,474 B2 | 3/2010 | Shtrom et al. | |
| 8,111,640 B2 | 2/2012 | Knox | |
| 8,384,600 B2 | 2/2013 | Huang et al. | |
| 8,390,519 B2 | 3/2013 | Wang et al. | |
| 8,750,798 B2 | 6/2014 | Rao et al. | |
| 2004/0157637 A1 | 8/2004 | Steer et al. | |
| 2006/0109191 A1 | 5/2006 | Shtrom et al. | |
| 2008/0079644 A1 | 4/2008 | Cheng | |
| 2008/0139136 A1 | 6/2008 | Shtrom et al. | |
| 2008/0182512 A1 | 7/2008 | Waters | |
| 2008/0198082 A1 | 8/2008 | Soler Castany et al. | |
| 2008/0284661 A1 | 11/2008 | He | |
| 2008/0297419 A1 | 12/2008 | Dou et al. | |
| 2009/0009401 A1 | 1/2009 | Suzuki et al. | |
| 2009/0010316 A1 | 1/2009 | Rofougaran | |
| 2009/0153411 A1 | 6/2009 | Chiang et al. | |
| 2009/0170450 A1 | 7/2009 | Krenz et al. | |
| 2009/0213011 A1 | 8/2009 | Tsai | |
| 2009/0251381 A1 | 10/2009 | Chou | |
| 2010/0295736 A1 | 11/2010 | Su | |
| 2011/0018780 A1 | 1/2011 | Tassoudji et al. | |
| 2011/0163922 A1 | 7/2011 | Wang et al. | |
| 2011/0215971 A1 | 9/2011 | Rao | |
| 2011/0298669 A1 | 12/2011 | Rao et al. | |
| 2012/0009884 A1 | 1/2012 | Rao et al. | |
| 2013/0135153 A1 | 5/2013 | Wang et al. | |
| 2013/0316662 A1 | 11/2013 | Bengtsson et al. | |
| 2014/0170992 A1 | 6/2014 | Wang et al. | |
| 2014/0198832 A1 | 7/2014 | Rao et al. | |

FOREIGN PATENT DOCUMENTS

| | | | |
|---|---|---|---|
| EP | 2003728 A1 | 12/2008 | |
| EP | 2117075 A1 | 11/2009 | |
| EP | 2230717 A1 | 9/2010 | |
| EP | 2262053 A1 | 12/2010 | |
| EP | 2320520 A1 | 5/2011 | |
| EP | 2346113 A2 | 7/2011 | |
| EP | 2408062 A1 | 1/2012 | |
| EP | 2 732 502 | 5/2014 | |
| EP | 2 732 503 | 5/2014 | |
| WO | 2011064444 A1 | 6/2011 | |
| WO | 2011105650 A1 | 9/2011 | |
| WO | 2012008946 A1 | 1/2012 | |
| WO | 2013012403 A1 | 1/2013 | |
| WO | 2013012404 A1 | 1/2013 | |

OTHER PUBLICATIONS

EPO, Communication Pursuant to Rules 161(1) and 162 EPC, Application No. 11735751.7, Mar. 25, 2014, 2 pgs.
USPTO, Advisory Action with Interview Summary, U.S. Appl. No. 13/751,521, Apr. 24, 2014, 7 pgs.
EPO, Communication of European Publication Number and Information on the Application of Article 67(3) EPC, Application No. 11735751.7, Apr. 24, 2014, 1 pg.
EPO, Communication of European Publication Number and Information on the Application of Article 67(3) EPC, Application No. 11749963.2, Apr. 24, 2014, 1 pg.
USPTO, Notice of Publication of Application, U.S. Appl. No. 14/232,372, Jun. 19, 2014, 1 pg.
USPTO, Notice of Publication of Application, U.S. Appl. No. 14/210,922, Jul. 17, 2014, 1 pg.
T. Yestrebsky, "MICRF001 Antenna Design Tutorial", App. Nt. 23, 1999, 8 pgs.
Karaboikis et al., "Compact Dual-Pritned Inverted-F Antenna Diversity System for Portable Wireless Devices", IEEE Antennas and Wireless Propagation Letters, vol. 3, 2004, pp. 9-14.
Mavridis et al., "Spatial Diversity Two-Branch Antenna for Wireless Devices", Electronics Letters, vol. 42, No. 5, Mar. 2, 2006, pp. 266-268.
Geyi et al., "Compact Multi-Feed Multi-Band Antenna Designs for Wireless Mobile Devices", Antenna and Propagation Society International Symposium, 2007, pp. 1036-1039.
Geyi et al., "Handset Antenna Design: Practice and Theory", PIER 80, 2008, pp. 123-160.
Pilcanic et al., "Actual Diversity Performance of a Multiband Diversity Antenna with Hand and Head Effects", IEEE Transactions on Antennas and Propagation, IEEE Service Center, vol. 57, No. 5, May 1, 2009, pp. 1547-1556.
Rao et al., "Compact Low Coupling Dual Antennas for MIMO Applications in Handheld Devices", IEEE 2009, 4 pgs.
Wang et al., "Patch Loaded Tri-Monopol Wideband Antenna for Mobile Applications", ICUWB 2009, 3 pgs.
Rao et al., "A Compact Dual-Port Diversity Antenna for Long-Term Evolution Handheld Devices", IEEE Transactions on Vehicular Technology, vol. 59, No. 3, Mar. 2010, pp. 1319-1329.
EPO, Extended Search Report, Application No. 10169286.1, Oct. 13, 2010, 14 pgs.
PCT, Search Report and Written Opinion, Application No. PCT/US2010/041747, European Patent Office, Oct. 13, 2010, 20 pgs.
Rao et al., "Design, Modeling, and Evaluation of a Multiband MIMO/Diversity Antenna System for Small Wireless Mobile Terminals", IEEE Transactions on Components, Packaging, and Manufacturing Technology, vol. 1, No. 3, Mar. 2011, pp. 410-419.
EPO, Communication Pursuant to Article 94(3) EPC, Application No. 10169286.1, Oct. 14, 2011, 8 pgs.
KIPO, Office Action, Application No. 10-2011-0001441, Dec. 21, 2011, 3 pgs.
PCT, Search Report and Written Opinion, Application No. PCT/US2011/044117, Mar. 28, 2012, 13 pgs.
PCT, Search Report and Written Opinion, Application No. PCT/US2011/044119, Mar. 28, 2012, 14 pgs.
USPTO, Office Action, U.S. Appl. No. 12/683,965, Jun. 20, 2012, 7 pgs.
KIPO, Notice of Decision for Patent, Application No. 10-2011-0001441, Jul. 10, 2012, 3 pgs.
EPO, Summons to Attend Oral Proceedings Pursuant to Rule 115(1) EPC, Application No. 10169286.1, Oct. 18, 2012, 6 pgs.
USPTO, Office Action, U.S. Appl. No. 12/683,965, Oct. 25, 2012, 7 pgs.

(56) References Cited

OTHER PUBLICATIONS

USPTO, Notice of Allowance, U.S. Appl. No. 12/683,965, Dec. 26, 2012, 5 pgs.
PCT, Notification Concerning Publication, Application No. PCT/US2011/044117, Jan. 24, 2013, 1 pg.
PCT, Notification Concerning Publication, Application No. PCT/US2011/044119, Jan. 24, 2013, 1 pg.
EPO, Brief Communication, Application No. 10169286.1, Jan. 25, 2013, 6 pgs.
EPO, Decision to Refuse a European Patent Application, Application No. 10169286.1, Feb. 14, 2013, 24 pgs.
EPO, Provision of a Copy of the Minutes in Accordance with Rule 124(4) EPC, Application No. 10169286.1, Feb. 14, 2013, 16 pgs.
SIPO, Office Action, Application No. 201110005935.5, Apr. 2, 2013, 9 pgs.
USPTO, Office Action, U.S. Appl. No. 12/834,675, May 2, 2013, 20 pgs.
CIPO, Office Action, Application No. 2,727,102, May 24, 2013, 2 pgs.
USPTO, Notice of Publication, U.S. Appl. No. 13/751,521, May 30, 2013, 1 pg.
PCT, Written Opinion, Application No. PCT/US2011/044117, Jun. 14, 2013, 6 pgs.
PCT, Written Opinion, Application No. PCT/US2011/044119, Jun. 14, 2013, 8 pgs.
SIPO, Office Action, Application No. 201110005935.5, Sep. 6, 2013, 6 pgs.
USPTO, Office Action, U.S. Appl. No. 13/751,521, Oct. 1, 2013, 9 pgs.
EPO, Extended Search Report, Application No. 11150282.9, Nov. 7, 2013, 6 pgs.
PCT, Notification of Transmittal of the International Preliminary Report on Patentability, Application No. PCT/US2011/044117, Nov. 11, 2013, 15 pgs.
PCT, Notification of Transmittal of the International Preliminary Report on Patentability, Application No. PCT/US2011/044119, Nov. 11, 2013, 16 pgs.
CIPO, Notice of Allowance, Application No. 2,727,102, Dec. 16, 2013, 2 pgs.
USPTO, Office Action, U.S. Appl. No. 12/834,675, Jan. 6, 2014, 15 pgs.
USPTO, Notice of Allowance, U.S. Appl. No. 12/834,675, Jan. 31, 2014, 9 pgs.
USPTO, Office Action, U.S. Appl. No. 13/751,521, Feb. 4, 2014, 8 pgs.
USPTO, Office Action, U.S. Appl. No. 14/210,922, Mar. 25, 2015, 23 pages.

\* cited by examiner

DIVERSITY ANTENNA MODULE AND ASSOCIATED METHOD FOR A USER EQUIPMENT (UE) DEVICE

CROSS-REFERENCE TO RELATED APPLICATION(S) & CLAIM OF PRIORITY

This application is a National Phase application of and claims the benefit under 35 U.S.C. §371 to International Application No. PCT/US2011/044117, filed Jul. 15, 2011 having the title "DIVERSITY ANTENNA MODULE AND ASSOCIATED METHOD FOR A USER EQUIPMENT (UE) DEVICE", which is hereby incorporated by reference into the detailed description hereof.

FIELD OF THE DISCLOSURE

The present patent disclosure generally relates to antennas. More particularly, and not by way of any limitation, the present patent disclosure is directed to a diversity antenna module having two or more antennas and associated method.

BACKGROUND

Recently, there has been an increasing thrust in the application of internal antennas in wireless communications devices. The concept of an internal antenna stems from the avoidance of using an external radiating element through the integration of the antenna into the communications device itself. Internal antennas have several advantageous features such as being less prone to external damage, reduced overall size of the communications device with optimization, and easy portability.

With the advent of mobile communications devices capable of operating in diversity function, designers have begun to use separate antennas in conjunction with a switching unit wherein each antenna operates in a distinct diversity performance. However, where multiple antennas are used in a device, their performance may deteriorate, in addition to necessitating usually unfavorable trade-offs between device size and performance. Such trade-offs can be that smaller devices may suffer performance problems, including shortened battery life and potentially more dropped calls, whereas devices with better performance require larger housings. In general, a key driver of this trade-off is mutual coupling between the antennas, which can result in wasted power when transmitting and a lower received power from incoming signals.

BRIEF DESCRIPTION OF THE DRAWINGS

A more complete understanding of the embodiments of the present patent disclosure may be had by reference to the following Detailed Description when taken in conjunction with the accompanying drawings wherein.

DETAILED DESCRIPTION OF THE DRAWINGS

The present patent disclosure is broadly directed to an embodiment of a compact diversity antenna module adapted for multiple applications wherein a high degree of diversity (e.g., spatial diversity (distance between antennas), pattern diversity (difference between antenna aiming directions), and polarization diversity) and reduced cross-coupling is achieved while still maintaining a stringent form factor.

In one aspect, the diversity antenna module comprises a first radiating element (i.e., a first antenna) adapted to operate with a first transceiver circuit operating in at least one band, wherein the first radiating element is disposed along a first side of a substrate. A second radiating element (i.e., a second antenna) is disposed along a second side of the substrate, wherein the second radiating element is adapted to operate with a second transceiver circuit operating in at least one band. Whereas the substrate may take on a number of geometric shapes and form factors, the first and second sides of the substrate are generally provided to be substantially perpendicular to each other. Additionally, the first and second radiating elements are also spatially dispersed from each other by a distance.

In another aspect, an embodiment of a wireless user equipment (UE) device such as, e.g., a mobile communications device having smartphone capabilities, is disclosed. The wireless UE device comprises a first transceiver circuit adapted to operate in at least one band and a second transceiver circuit adapted to operate in at least one band. Additionally, an antenna module is included which comprises a substrate operating as a ground plane; a first radiating element (i.e., a first antenna) adapted to operate with the first transceiver circuit, wherein the first radiating element is disposed along a first side of the substrate; and a second radiating element (i.e., a second antenna) adapted to operate with the second transceiver circuit, wherein the second radiating element is disposed along a second side of the substrate. The first and second sides of the substrate are generally provided to be substantially perpendicular to each other, wherein the substrate may have a form factor compliant with the housing dimensions of the wireless UE device and first and second radiating elements are spatially dispersed from each other by a distance.

In another aspect, an embodiment of a method for assembling a diversity antenna module is disclosed. The claimed embodiment comprises providing a first radiating element adapted to operate with a first transceiver circuit operating in at least one band and providing a second radiating element adapted to operate with a second transceiver circuit operating in at least one band. In an exemplary implementation, the first radiating element (i.e., the first antenna) is disposed along a first side of a substrate that can comprise a variety of form factors and dimensions. The second radiating element is disposed along a second side of the substrate, wherein the second side is generally provided to be substantially perpendicular to the first side of the substrate. In certain implementations, however, the angle between the first and second sides of the substrate may vary and comprise an angular orientation other than 90°. Furthermore, the first and second radiating elements are provided to be spatially dispersed from each other by a distance that may be application-dependent and guided by the dimensions of the substrate that operates as a ground plane in a user equipment device. In a further variation, the first and second radiating elements may be provided with suitable feed ports for facilitating coupling to respective transceiver circuits.

Figure 1:
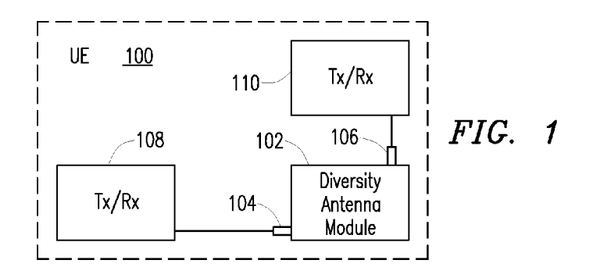
FIG. 1 depicts a functional block diagram of an example wireless user equipment (UE) device having an embodiment of a diversity antenna assembly or module of the present patent application wherein radio communications involving at least two different frequency bands can take place.

Embodiments of an apparatus and associated method relating to a compact diversity module or assembly thereof of the present patent disclosure will now be described with reference to various examples of how the embodiments can be made and used. Like reference numerals are used throughout the description and several views of the drawings to indicate like or corresponding parts to the extent feasible, wherein the various elements may not necessarily be drawn to scale. Referring now to the drawings, and more particularly to FIG. 1, depicted therein is a functional block diagram of an example wireless UE device 100 having an embodiment of a diversity antenna assembly or module 102 of the present patent application. Without limitation, UE 100 may comprise any mobile communications device that is capable of conducting wireless communications in multiple bands and/or access technologies, including, for example, both short-range communications as well as wide area cellular telephony communications, either in packet-switched network domains, circuit-switched network domains, or both. Accordingly, by way of illustration, UE 100 having an antenna assembly embodiment of the present patent disclosure may be operable with any frequency range or ranges associated a number of cellular telecommunications technologies such as various Global System for Mobile Communications (GSM) technologies (e.g., GSM 800 MHz to GSM 1900 MHz), Enhanced Data Rates for GSM Evolution (EDGE), Long Term Evolution (LTE), Integrated Digital Enhanced Network (IDEN), any type of Code Division Multiple Access (CDMA) technologies, Universal Mobile Telecommunications System (UMTS), or any 2nd- 2.5- 3rd- or subsequent Generation telecommunications technologies. In addition, UE 100 can also effectuate wireless communications in frequency range or ranges according to such standards as, e.g., the well-known Institute of Electrical and Electronics Engineers (IEEE) standards, like IEEE 802.11a/b/g/n standards or other related standards such as HiperLan standard, HiperLan II standard, Wi-Max standard, OpenAir standard, and Bluetooth standard. Regardless of the foregoing technologies and/or frequency bands set forth above, the teachings of the present disclosure will be particularly exemplified hereinbelow, without limitation, relative to a multi-band dual diversity antenna module embodiment that can operate in lower radio frequency (RF) bands such as 800 MHz and 900 MHz bands, as well as the higher RF bands such as Digital Cellular Service (DCS) 1800 MHz and Personal Communications Service (PCS) 1900 MHz bands. Those skilled in the art will recognize that a cellular telecommunications technology such as GSM can operate in a number of lower and higher radio frequency bands such as the foregoing, and irrespective of the frequency designation, different uplink and downlink frequencies may be employed within the applicable ranges around 800 MHz, 900 MHz, 1800 MHz or 1900 MHz. Accordingly, as illustrated in the functional block diagram of FIG. 1, UE 100 includes suitable transceiver circuitry (e.g., a first transceiver circuit) 108 operating in at least one frequency band as well as suitable transceiver circuitry (e.g., a second transceiver circuit) 110 operating in at least one frequency band. The diversity antenna assembly 102 includes a first feed port or point 104 for facilitating a connection to the first transceiver circuit 108 and a second feed port or point 106 for facilitating a connection to the second transceiver circuit 110. In one implementation, both the first and second transceiver circuits 108, 110 may be provided as multi-band transceiver circuitry adapted to operate with at least one of a radio frequency (RF) band in a range from about 800 MHz to 900 MHz and an RF band in a range from about 1800 MHz to 1900 MHz. Accordingly, it should be apparent to one skilled in the art that at least in one variation, an embodiment of the present disclosure includes multi-band transceiver circuits that could be operating in the same bands or different bands in association with the diversity antenna assembly 102.

Figure 2A:
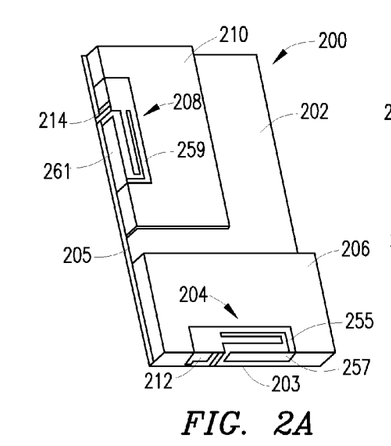
FIGS. 2A and 2B depicts two views of an example embodiment of a diversity antenna module.
Figure 2B:
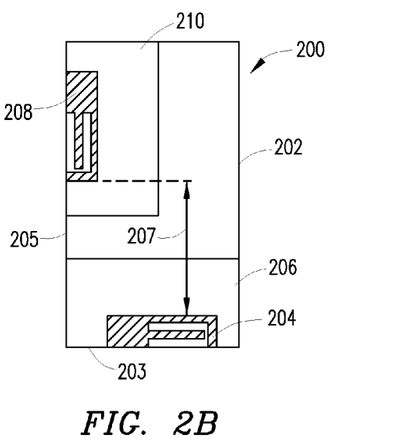

FIGS. 2A and 2B depicts two views of an example embodiment of a diversity antenna module 200 which can be employed in UE 100 described above for purposes of the present patent disclosure. In particular, FIG. 2A depicts a 3-dimensional (3D) view of the antenna module 200 and FIG. 2B depicts a 2-dimensional (2D) planar view or top view (e.g., X-Y view) of the antenna module 200. Taking reference to FIGS. 2A and 2B together, the exemplary antenna module 200 comprises at least two radiating elements (i.e., antenna elements) that are disposed on a suitable substrate 202 as will be described in detail below. At least a first radiating element 204 is disposed along a first side or edge 203 of the substrate 202 and at least a second radiating element 208 is disposed along a second side or edge 205 of the substrate 202. Whereas the substrate 202 may take on any geometric shape, size or form factor (e.g., a rectangle, a square, etc., with or without features such as cut-outs, notches, extensions, apertures, and the like) that complies with a UE device's housing within which it is placed, it is generally substantially planar wherein the first and second sides thereof are substantially perpendicular to each other. In some variations, the first and second sides of the substrate 202 may be provided at an angle that is different than 90°, which can vary by ±10° to ±15°, for example. Regardless of the shape or size, the substrate 202 may be provided as an electrical ground plane with respect to elements such as, e.g., the antenna elements 204, 208 or other electrical components of a UE device in which it is housed.

As illustrated in the embodiment of FIGS. 2A and 2B, the substrate 202 is generally of rectangular shape having a thickness of about 1.5 mm, wherein the first side 203 is about 55 mm and the second side 205 is about 95 mm. In terms of manufacture, the substrate 202 may be comprised of any suitable printed circuit board (PCB) material. In one specific embodiment, the substrate 202 may be formed from FR-4 grade glass-reinforced epoxy laminate material. Each antenna element 204, 208 may be supported on a respective dielectric supporter 206, 210 that is mounted on or otherwise affixed to the substrate 202. The dielectric supporters 206, 210 may comprise solid or hollow rectangular blocks having a thickness that is compliant with the housing dimensions of the UE device. In one specific embodiment, the dielectric supporters 206 and 210 have a thickness of about 9 mm and are sized to support radiating antenna elements with a size and shape adapted to a particular application. In general, the radiating elements 204 and 208 may be provided as 3-dimensional structures of electrically active portions. In the exemplary embodiment of FIGS. 2A and 2B, the radiating elements 204, 208 have a size of about 30 mm by 10 mm by 9 mm. First radiating element 204 may be provided as a first electrical portion 255 and a second electrical portion 257, wherein the first electrical portion 255 is disposed on a horizontal plane (i.e., top plane) of the dielectric supporter 206 and second electrical portion 257 is disposed on a vertical plane (i.e., side plane) that is generally orthogonal to the horizontal plane and aligned with the first side 203 of the substrate 202. Likewise, second radiating element 208 may be provided as a first electrical portion 259 that is disposed on a horizontal plane (i.e., top plane) of the dielectric supporter 210 and a second electrical portion 261 coupled thereto and disposed on a vertical plane (i.e., side plane) that is generally orthogonal to the horizontal plane and aligned with the second side 205 of the substrate 202. As to providing electrical connectivity, for example, to respective transceiver circuitry, first and second radiating elements 204 and 208 include respective feed ports 212 and 214 formed on the respective vertical electrical portions.

Furthermore, the respective electrical portions of the first and second radiating elements 204, 208 may comprise any known or heretofore unknown antenna elements, and may include features such as notches, cut-outs, grooves, extensions, prongs, combs, and the like. For example, the first and second radiating elements 204, 208 may be formed of structures such as inverted F antenna (IFA) strip elements, planer inverted F antenna (PIFA) elements, modified inverted F antenna (MIFA) strip elements, slot antenna elements, patch antenna elements, L-shaped strip elements, or any combination thereof. It should be further appreciated that the first radiating element 204 (along with its dielectric supporter 206) may be placed anywhere along the first side 203 of the substrate 202 and, likewise, the second radiating element 208 (along with its dielectric supporter 210) may be placed anywhere along the second side 205 of the substrate 202, subject to any form factor design constraints relevant to a particular application and device housing. Accordingly, by placing the second radiating element 208 at a distance (d) 207 relative to the placement of the first radiating element 204, appropriate spatial diversity may be achieved with respect to the overall antenna performance in the frequency bands of interest.

Figure 3:
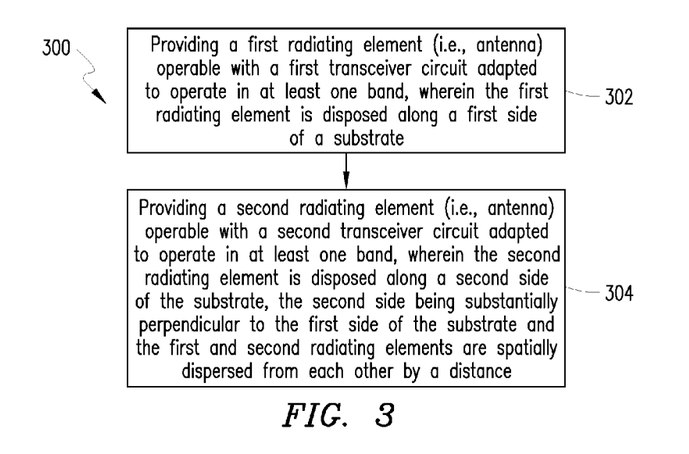
FIG. 3 is a flowchart of an example method of the present patent application.

FIG. 3 is a flowchart of an example method 300 of the present patent application with respect to assembling a diversity antenna module in one embodiment. A first radiating element operable with a first transceiver circuit adapted to operate in at least one frequency band is provided on a suitable substrate with appropriate shape, geometry, measurements, and the like, wherein the first radiating element is disposed along a first side or edge of the substrate (block 302). As described hereinabove, the first radiating element may be provided as one or more electrical portions that are supported on a suitable dielectric supporter mounted on or otherwise affixed to the substrate. A second radiating element operable with a second transceiver circuit adapted to operate in at least one frequency band is provided, wherein the second radiating element is disposed along a second side or edge of the substrate. Similar to the first radiating element, the second radiating element may also be provided as one or more electrically active portions that are supported on a suitable dielectric supporter mounted on or otherwise affixed to the substrate. The first and second sides of the substrate are provided to be substantially perpendicular to each other and the first and second radiating elements are spatially dispersed from each other by a distance (block 304). As set forth above, the first and second radiating elements each include a feed port that are substantially orthogonal to each other.

In the foregoing configuration of the diversity antenna module 200, one of the radiating elements may be treated as a "main" antenna and the other radiating element may be treated as a "diversity" antenna. For example, the radiating element 204 at the bottom of the substrate 202 may be configured as the main antenna while the radiating element 208 located along the side of the substrate 202 may be configured as the diversity antenna. The exemplary antenna configuration is advantageous in achieving diversity performance in a mobile handset form factor by varying the relative positions/locations of the respective antenna arrangements. An optimal arrangement may be achieved wherein the antenna's respective feed ports or points are as far from each other as possible within the form factor constraints. As the spatial diversity of the antenna module 200 can be dependent upon the relative distance between the main and diversity antennas, by providing a variable distance (d) that is at least greater than 80 mm or thereabouts, a higher diversity gain (DG) may be achieved.

Further, the arrangement of the radiating elements 204, 208 of the diversity antenna module 200 helps reduce correlation between the radiation patterns associated with the radiating elements. As a result, increased diversity performance may be obtained in a Multiple Input Multiple Output (MIMO) system. Since the exemplary configuration facilitates placement of feeding ports near or at the corners of the substrate (e.g., by moving the respective radiating elements to the diagonal corners, one being the right hand corner on the first side (i.e., the bottom side) and the other being the top left corner on the second side), higher DG performance may be obtained in such a system. Because of the placement of the antennas, substantially orthogonal radiation patterns may be observed, as will be seen below, at each center frequency band of interest. Whereas the main antenna has a major radiating pattern substantially in a horizontal direction, the diversity antenna has a major radiating pattern substantially in a vertical direction. Thus, the aforesaid diversity antenna configuration also affords polarization diversity and pattern diversity.

Figure 4A:
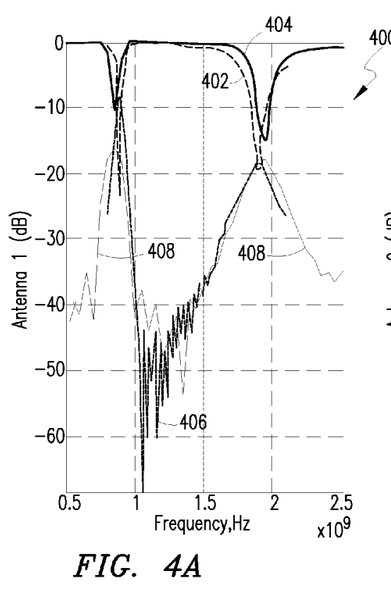
FIGS. 4A and 4B depict graphical representations of simulated and measured return loss data associated with an embodiment of the diversity antenna module of the present patent application.
Figure 4B:
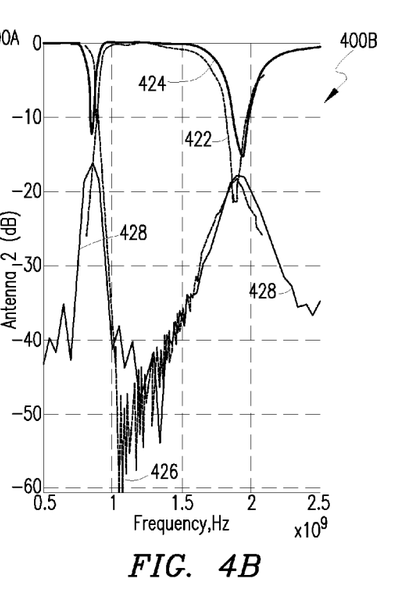

Having set forth the general structure and assembly of the compact diversity multi-band antenna module of the present patent application, various electrical and/or performance parameters associated with an embodiment of the diversity antenna module will now be described. FIGS. 4A and 4B depict graphical representations of simulated and measured return loss data associated with an embodiment of the diversity antenna module. In particular, FIG. 4A depicts a graphical representation 400A of simulated and measured return loss parameters (also referred to as scattering (S) parameters) for the first radiating element 204 and FIG. 4B depicts a graphical representation 400B of simulated and measured return loss parameters for the second radiating element 208 shown in FIGS. 2A and 2B. Curves 402 and 404 in FIG. 4A depict, respectively, measured and simulated return loss parameter $S_{11}$ associated with the first radiating element 204. Curves 406 and 408 in FIG. 4A depict, respectively, measured and simulated return loss parameter $S_{12}$ that represents the coupling effect between the first and second radiating elements 204, 208 of the diversity antenna module of the present patent application. Likewise, curves 422 and 424 in FIG. 4B depict, respectively, measured and simulated return loss parameter $S_{22}$ associated with the second radiating element 208. Curves 426 and 428 in FIG. 4B depict, respectively, measured and simulated return loss parameter $S_{21}$ that represents the coupling effect between the first and second radiating elements 204, 208. As one of skill in the art can appreciate, S-parameters refer to the elements of what is known as the scattering matrix, a mathematical construct that quantifies how electromagnetic (EM) radiation (e.g., RF energy) propagates through a network having one or more ports. Since both first and second radiating elements (i.e., antenna elements) are placed in sufficient proximity in order to achieve the compactness needed for wireless UE applications, the diversity antenna module may be modeled as a two-port system, wherein each radiating element is provided with a feed port. For an RF signal incident on one port, some fraction of the signal bounces back out from that port, some of it scatters and exits from other ports (i.e., inter-port coupling), and some of it may disappear as heat or even EM radiation. The S-matrix for an N-port network model thus contains $N^2$ coefficients (in an N-by-N matrix).

In a basic sense, S-parameters refer to RF "voltage out versus voltage in" relationships of the ports. Diagonal elements, $S_{ii}$, are the ratio of reflected voltage to the incident voltage at a port i. Cross-port phenomena are represented as $S_{ij}$ which can be thought of as the transfer function where "j" is the port that is excited (i.e., the input port where the EM radiation is incident) and "i" is the output port. While S-parameters are complex variables (having both magnitude and phase angle), often only the magnitudes are measured since it is generally more relevant to determine how much cross-port gain (or loss) is effected in a design. While S-parameters are commonly defined for a given frequency and system impedance, they generally vary as a function of frequency for any non-ideal network.

In a two-port model applicable to the exemplary diversity antenna assembly module of the present disclosure (since there are two radiating elements, each having a single feed port), there are two feed ports, thereby giving rise to a 2×2 matrix having four S-parameters. For the two-port diversity antenna assembly model, accordingly, the S-matrix comprises the following four elements: $\{S_{11}, S_{12}, S_{21}, S_{22}\}$, where the diagonal elements (i.e., $S_{11}$ and $S_{22}$) are referred to as reflection coefficients because they describe what happens at a single port (either at the port of the first radiating element or at the port of the second radiating element). The off-diagonal elements (i.e., $S_{12}$ and $S_{21}$) are referred to as transmission coefficients (or transfer functions) since they describe the cross-port phenomena. As illustrated in FIGS. 4A and 4B, it can be seen that simulated $S_{11}$, $S_{21}$, $S_{12}$ and $S_{22}$ parameters plotted in dB versus frequency (based on a model derived for the exemplary dual-band diversity antenna module) follow fairly closely the measured $S_{11}$, $S_{21}$, $S_{12}$ and $S_{22}$ parameters plotted on the same dB versus frequency graphs. It can further be seen that simulated and measured S-parameters show desirable characteristics at 800 MHz-900 MHz (i.e., the lower RF bands) and at 1800 MHz-1900 MHz (i.e., the higher RF bands).

FIGS. 5A-5D depict simulated and measured 2D radiation patterns associated with an embodiment of the diversity antenna module of the present patent application. As is known in the art, the radiation pattern of an antenna element is a graphical depiction of the relative field strength transmitted from or received by the antenna element. As antennas radiate in space often several curves are necessary to describe the antenna. If the radiation of the antenna is symmetrical about an axis (as is the case in dipole and helical antennas, for example) a unique graph is typically sufficient. Radiation pattern of an antenna can be defined as the locus of all points where the emitted power per unit surface is the same. The radiated power per unit surface is proportional to the squared electrical field of the electromagnetic wave; therefore, the radiation pattern is the locus of points with the same electrical field. Whereas the radiation patterns are 3-dimensional in nature and thus may be represented in polar or spherical coordinates, 2-dimensional planar views may be obtained by holding either θ (angle with respect to the z-axis) or φ (angle with respect to the x-axis) at 0° or 90°. For example, if θ=90°, an XOY plane view of the radiation pattern may be obtained. Likewise, XOZ and YOZ planar views may be obtained with φ being 0° and 90°, respectively.

Figure 5A:
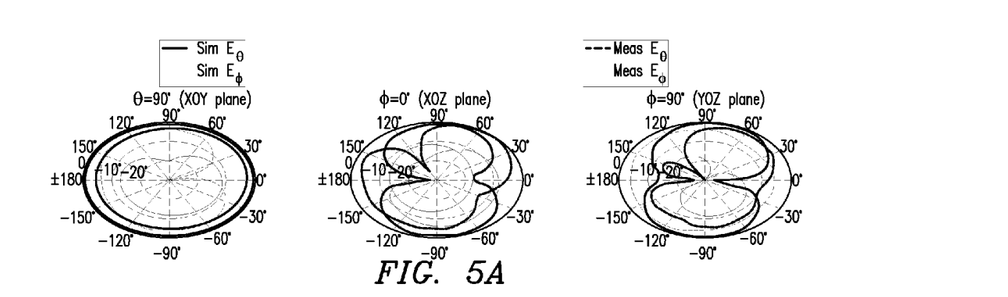
FIGS. 5A-5D depict simulated and measured 2D radiation patterns associated with an embodiment of the diversity antenna module of the present patent application.
Figure 5B:
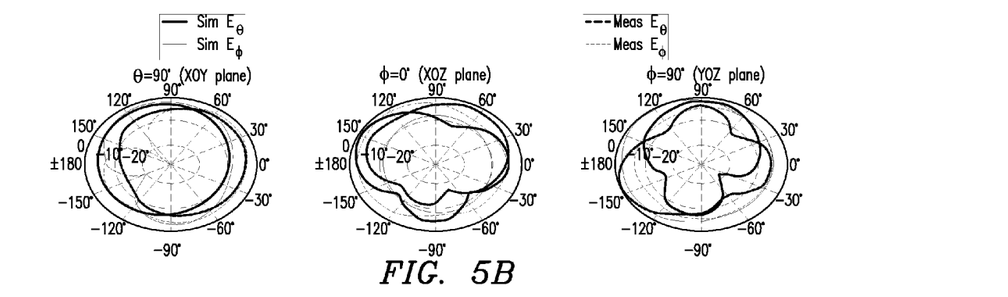
Figure 5C:
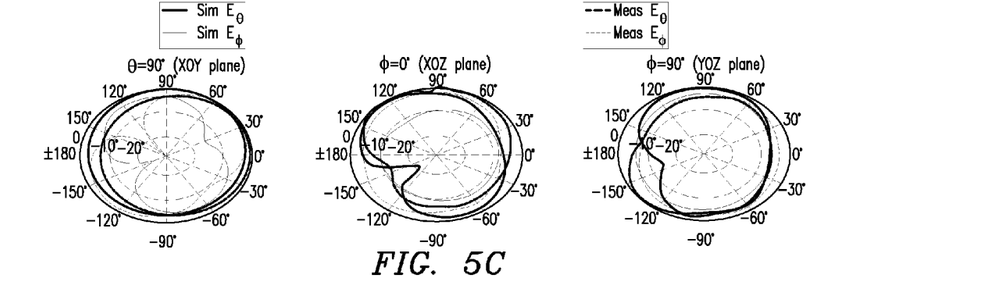
Figure 5D:
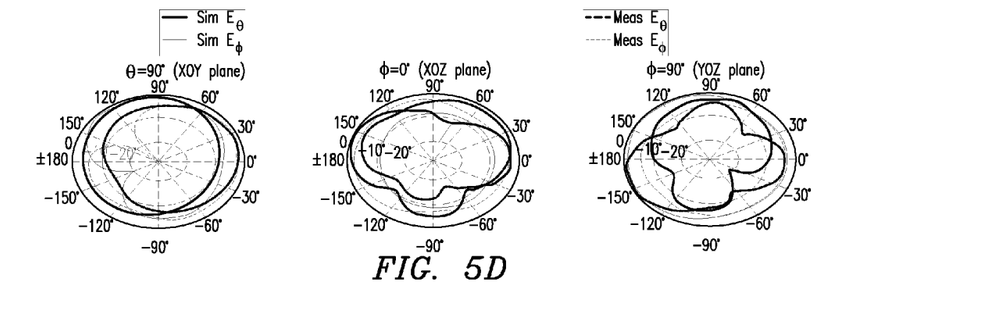

In the planar views shown in FIGS. 5A to 5D, the outer extent or contour of the graph represents a signal level of 0 dB, while the first and second reference dotted lines (going in from the outermost 0 dB reference contour) represent signal levels of −10 dB and −20 dB, respectively. FIG. 5A illustrates a panel of three planar views (i.e., XOY, XOZ and YOZ views) and of the simulated and measured radiation patterns associated with the first radiation element 204 at 900 MHz. FIG. 5B illustrates a panel of the same three planar views of the simulated and measured radiation patterns associated with the first radiation element 204 at 1900 MHz. Likewise, FIG. 5C illustrates a panel of three planar views of the simulated and measured radiation patterns associated with the second radiation element 208 at 900 MHz and FIG. 5D illustrates a panel of three planar views of the simulated and measured radiation patterns associated with the second radiation element 208 at 1900 MHz. Each of the three planar views (i.e., the XOY view, the XOZ view or the YOZ view) of the four panels graphically shows both the E-theta ($E_θ$) and E-phi ($E_φ$) components of the electrical field. Accordingly, each planar view of a panel illustrates four curves, two for simulated $E_θ$ and $E_φ$ components and two for the corresponding measured $E_θ$ and $E_φ$ components.

Figure 6:
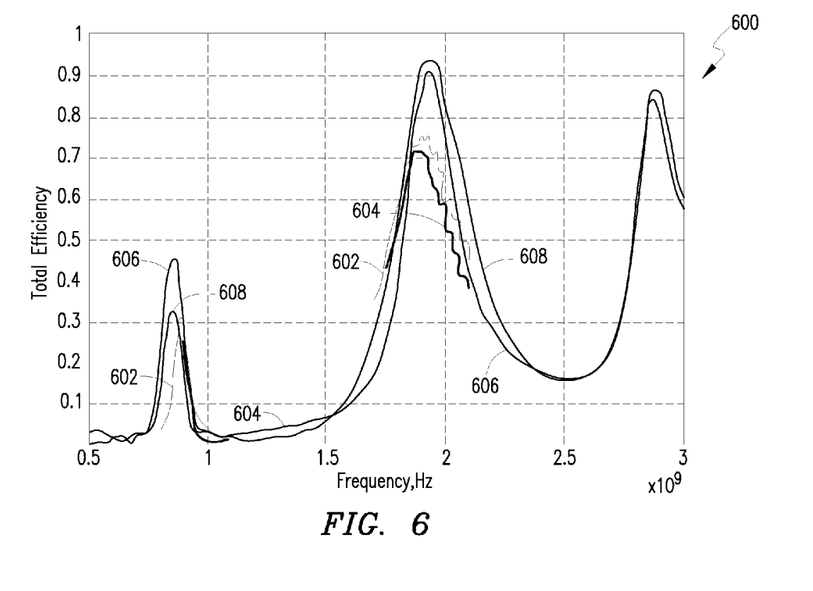
FIG. 6 depicts a graphical representation of simulated and measured total efficiency data associated with an embodiment of the diversity antenna module of the present patent application.

FIG. 6 depicts a graphical representation 600 of simulated and measured total efficiency (η) associated with an embodiment of the diversity antenna module of the present patent application. As is known, efficiency (η) of an antenna element may be given as the ratio of the RF power radiated from that element to the RF power input into the element. Curves 602 and 604 represent the measured efficiency (η) parameter plotted against frequency for the first and second radiating elements of the diversity antenna module. Curves 606 and 608 likewise represent the efficiency data for the first and second radiating elements simulated under certain conditions. As can be seen from the graphical representation, both simulated and measured efficiency values peak at the 800 MHz-900 MHz range and the 1800 MHz-1900 MHz range for both first and second radiating elements of the antenna module of the present disclosure.

Figure 7:
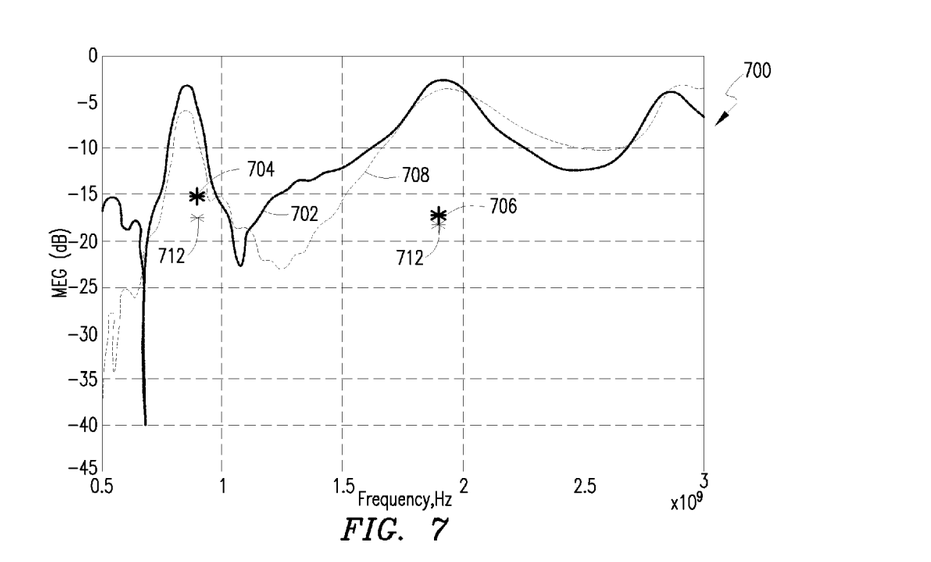
FIG. 7 depicts a graphical representation of simulated and measured mean effective gain (MEG) data associated with an embodiment of the diversity antenna module of the present patent application.

FIG. 7 depicts a graphical representation 700 of simulated and measured mean effective gain (MEG) associated with an embodiment of the diversity antenna module of the present patent application. The MEG value, which indicates the average received power in a Rayleigh fading environment, is measured in dB that is plotted against frequency using an indoor Gaussian channel model. Curve 702 represents the simulated MEG data associated with the first radiating element of the present antenna module. Data points 704 and 706 represent the measured MEG values at the 800 MHz-900 MHz banc and the 1800 MHz-1900 MHz band, respectively, for the first radiating element. In similar fashion, curve 708 represents the simulated MEG data associated with the second radiating element. Corresponding measured MEG data points for the second radiating element are shown as data points 710 and 712 at the 800 MHz-900 MHz band and the 1800 MHz-1900 MHz band, respectively.

Figure 8:
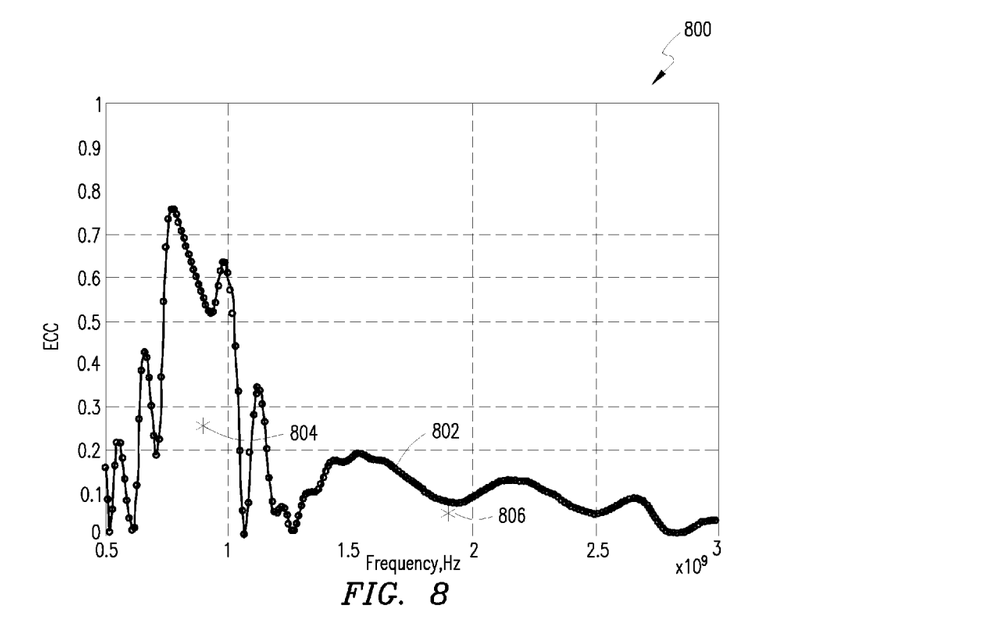
FIG. 8 depicts a graphical representation of simulated and measured envelope correlation coefficient (ECC) data associated with an embodiment of the diversity antenna module of the present patent application.

FIG. 8 depicts a graphical representation 800 of simulated and measured envelope correlation coefficient (ECC) data associated with an embodiment of the diversity antenna module of the present disclosure. For purposes herein, ECC (ρ) is based on an indoor Gaussian channel model, which shows the influence of different propagation paths of the RF signals that reach the antenna elements. In general, this coefficient varies from 0 to 1 and is plotted against frequency. Ideal antenna performance is achieved when this parameter approximates to zero. In the graphical representation 800 of FIG. 8, curve 802 illustrates the simulated ECC value as a variable against frequency. Data points 804 and 806 represent the measured ECC values at the 800 MHz-900 MHz band and the 1800 MHz-1900 MHz band, respectively, for the present diversity antenna module. It should be appreciated that the measured ECC values are fairly low, especially for the higher RF band.

Figure 9A:
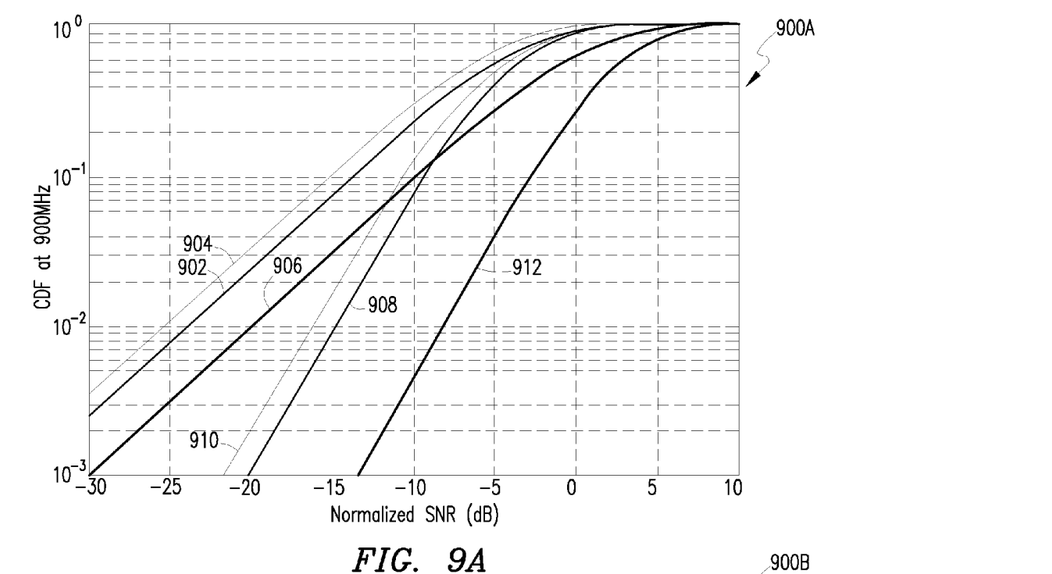
FIGS. 9A and 9B depict graphical representations of simulated and measured cumulative distribution functions (CDF) associated with an embodiment of the diversity antenna module of the present patent application using a Gaussian channel model.

FIGS. 9A and 9B depict graphical representations of simulated and measured cumulative distribution functions (CDF) associated with an embodiment of the diversity antenna module of the present patent application using an indoor Gaussian channel model. Reference numeral 900A in FIG. 9A generally refers to the graphical representation of CDF at 900 MHz as a function of normalized signal-to-noise ratio (SNR) in dB. Curves 902, 904 and 906 relate to a hypothetical or test single antenna arrangement (i.e., with only one radiating element), wherein curve 902 represents measured CDF, curve 904 represents simulated CDF and curve 906 represents the CDF for an ideal single antenna at 900 MHz. Curves 908, 910 and 912 relate to a diversity antenna module having two antenna elements (i.e., radiating elements) according to an embodiment of the present disclosure, wherein curve 908 represents measured CDF, curve 910 represents simulated CDF and curve 912 represents the CDF for an ideal 2-antenna arrangement at 900 MHz.

Figure 9B:
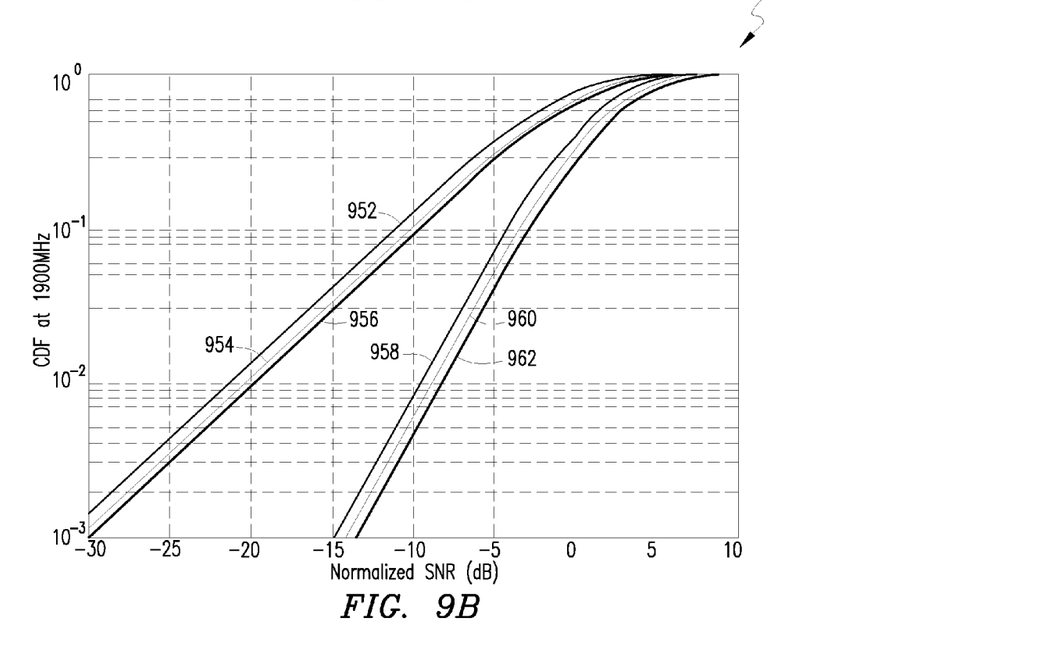

In similar fashion, FIG. 9B depicts a graphical CDF representation 900B at 1900 MHz as a function of normalized SNR in dB for both a single antenna arrangement and an embodiment of the diversity antenna module. Curves 952, 954 and 956 relate to the CDFs of the single antenna arrangement, wherein curve 952 represents measured CDF, curve 954 represents simulated CDF and curve 956 represents the CDF for an ideal single antenna at 1900 MHz. Curves 958, 960 and 962 relate to a diversity antenna module having two antenna elements (i.e., radiating elements) according to an embodiment of the present disclosure, wherein curve 958 represents measured CDF, curve 960 represents simulated CDF and curve 962 represents the CDF for an ideal 2-antenna arrangement at 1900 MHz.

Figure 10A:
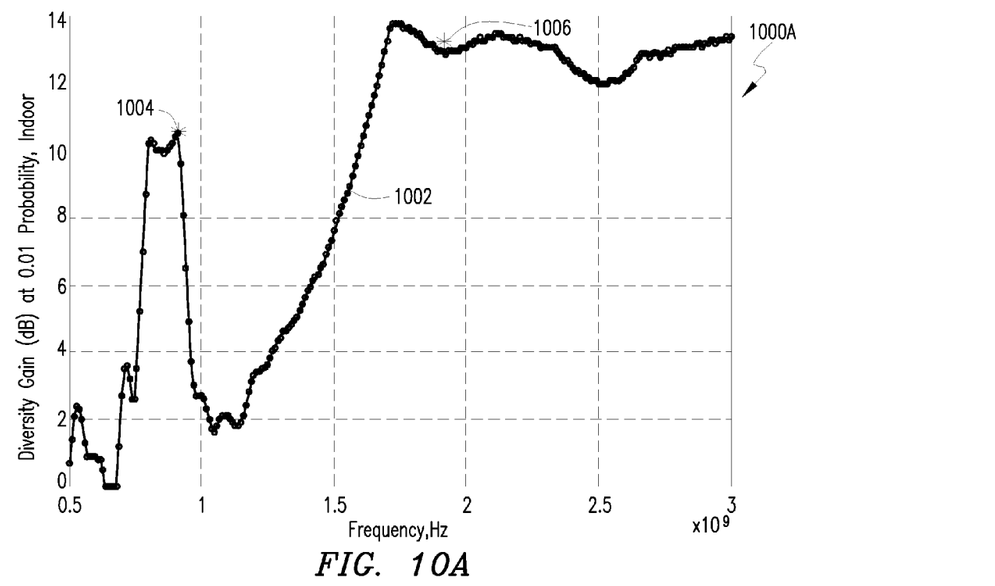
FIGS. 10A-10C depict graphical representations of simulated and measured diversity gain (DG) data associated with an embodiment of the diversity antenna module of the present patent application using a Gaussian channel model.
Figure 10B:
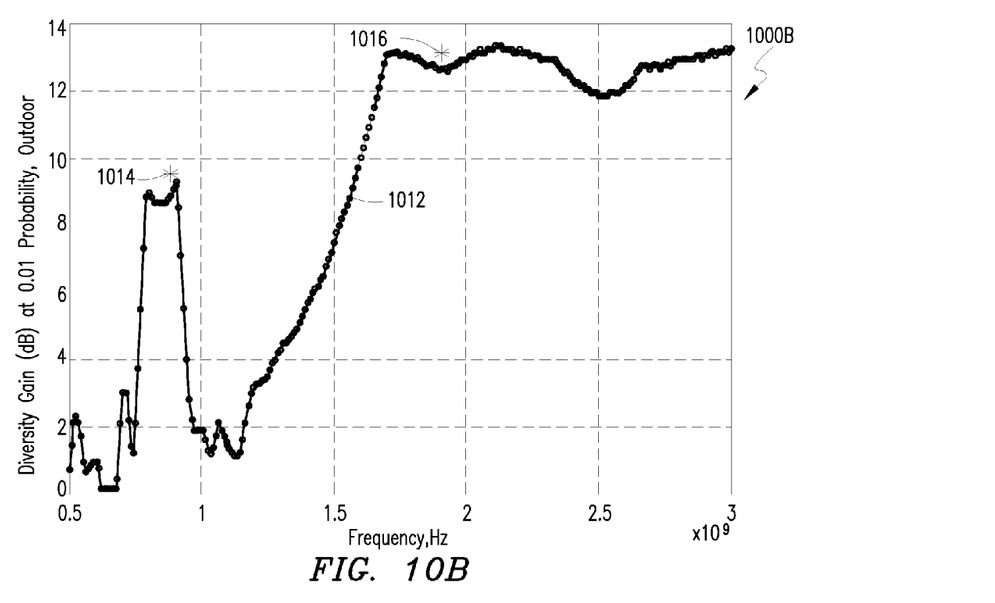
Figure 10C:
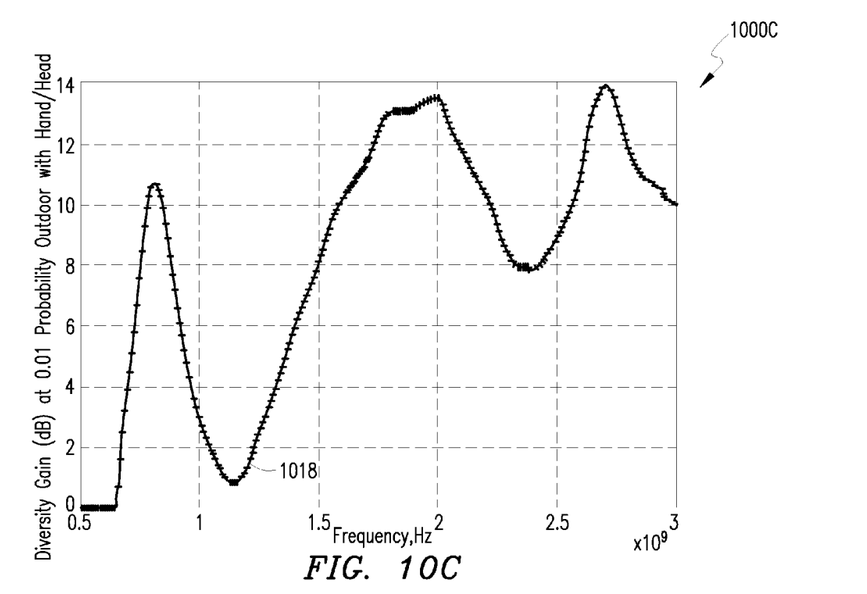

FIGS. 10A-10C depict graphical representations of simulated and measured diversity gain (DG) associated with an embodiment of the diversity antenna module of the present patent application using different Gaussian channel models with maximal ratio combining (MRC). It should be appreciated by those skilled in the art that the diversity performance of a multi-channel antenna system can be presented in the terms of diversity gain (DG), which is a relative measurement of the improvement of a time-averaged SNR value of the combined signals of the system relative to the signal from the best performing antenna of the same system. In a maximal ratio combining scenario, each signal branch is multiplied by a weight factor that is proportional to the signal amplitude. That is, branches with strong signals are generally further amplified, while weak signals are attenuated.

Reference numeral 1000A in FIG. 10A generally refers to the graphical representation of diversity gain (in dB) at P (probability)=0.01 using an indoor channel model that is plotted against frequency. Curve 1002 in FIG. 10A represents diversity gain as a function of frequency under simulation and data points 1004 and 1006 represent the measured DG values at the 800 MHz-900 MHz band and the 1800 MHz-1900 MHz band, respectively, for an embodiment of the present diversity antenna module. FIG. 10B depicts a graphical representation 1000B of diversity gain (in dB) at P (probability)=0.01 using an outdoor channel model, wherein curve 1012 represents a plot of diversity gain as a function of frequency under simulation and data points 1014 and 1016 represent the measured DG values at the 800 MHz-900 MHz band and the 1800 MHz-1900 MHz band, respectively, for an embodiment of the present diversity antenna module. FIG. 10C depicts a graphical representation 1000C of diversity gain (in dB) at P (probability)=0.01 using a more realistic outdoor channel model involving a handset-to-head use mode, wherein curve 1018 represents diversity gain for a simulated diversity antenna module as a function of frequency. It can be seen that in the exemplary embodiment of the antenna configuration, DGs of 9 dB or greater can be achieved at the center frequencies in the bands of interest.

Figure 11A:
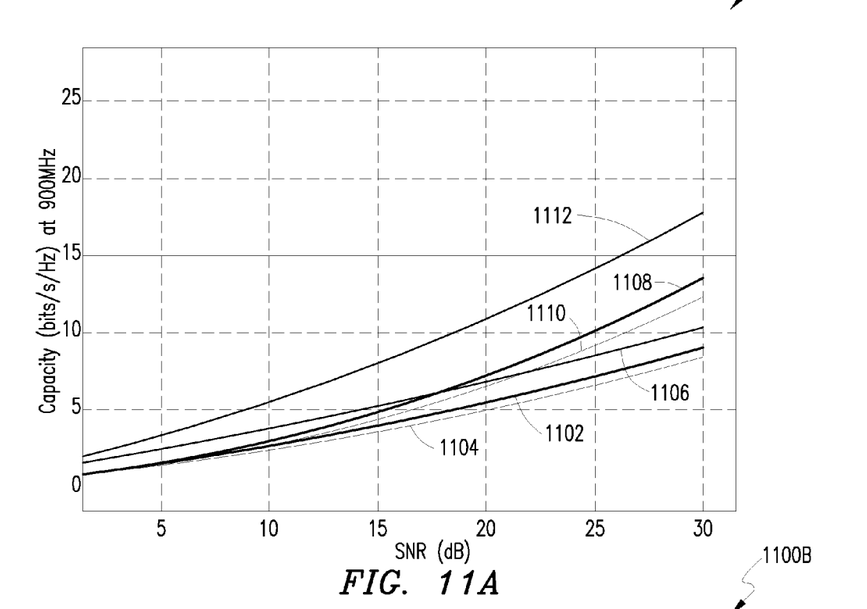
FIGS. 11A-11C depict graphical representations of simulated and measured capacity data associated with an embodiment of the diversity antenna module of the present patent application using maximal ratio combining (MRC) with a Gaussian channel model.
Figure 11B:
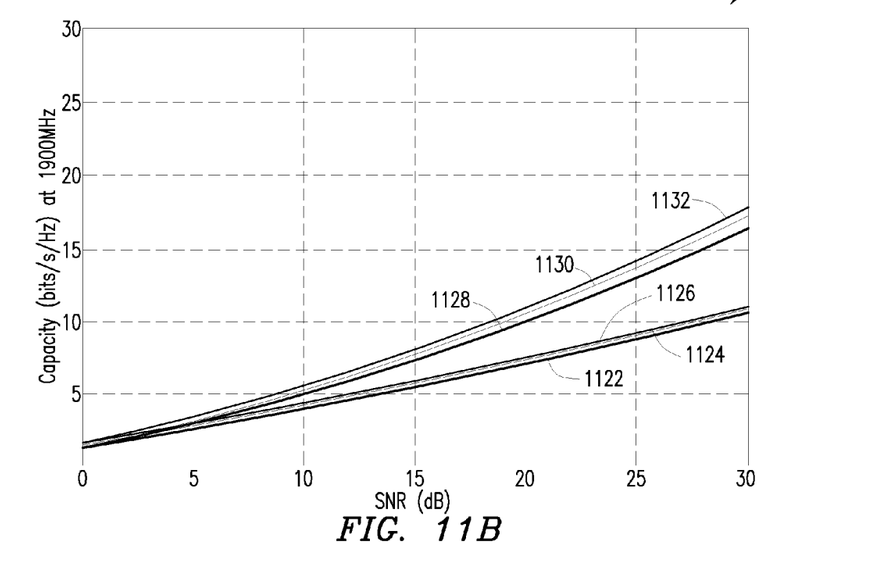
Figure 11C:
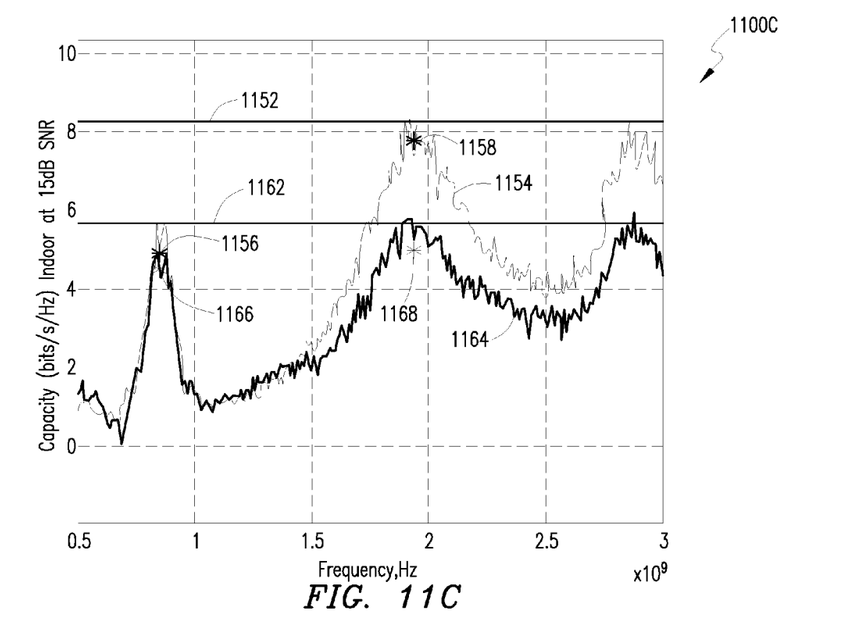

FIGS. 11A-11C depict graphical representations of simulated and measured capacity data associated with an embodiment of the diversity antenna module of the present patent application using maximal ratio combining (MRC) with a Gaussian channel model. Reference numeral 1100A in FIG. 11A generally refers to the graphical representation of capacity (bits/s/Hz) at 900 MHz as a function of signal-to-noise ratio (SNR) in dB. Curves 1102, 1104 and 1106 relate to a hypothetical test antenna arrangement having a single radiating element, wherein curve 1102 represents measured capacity, curve 1104 represents simulated capacity and curve 1106 represents the capacity function for an ideal single antenna at 900 MHz. Curves 1108, 1110 and 1112 in FIG. 11A relate to a diversity antenna module having two antenna elements (i.e., radiating elements) according to an embodiment of the present disclosure, wherein curve 1108 represents measured capacity, curve 1110 represents simulated capacity and curve 1112 represents the capacity function for an ideal 2-antenna arrangement at 900 MHz.

In similar fashion, FIG. 11B depicts a graphical representation 1100B of capacity (bits/s/Hz) at 1900 MHz as a function of SNR in dB for both a hypothetical single antenna arrangement and an embodiment of the diversity antenna module. Curves 1122, 1124 and 1126 relate to the capacity functions of the single antenna arrangement, wherein curve 1122 represents measured capacity, curve 1124 represents simulated capacity and curve 1126 represents the capacity function for an ideal single antenna at 1900 MHz. Curves 1128, 1130 and 1132 in FIG. 11B relate to a diversity antenna module having two antenna elements (i.e., radiating elements) according to an embodiment of the present disclosure, wherein curve 1128 represents measured capacity, curve 1130 represents simulated capacity and curve 1132 represents the capacity function for an ideal 2-antenna arrangement at 1900 MHz.

FIG. 11C shows a graphical representation 1100C of capacity (bits/s/Hz) at a particular SNR plotted against frequency. Curve 1152 represents capacity at SNR of 15 dB for an ideal diversity antenna module having two radiating elements. Curve 1154 represents simulated capacity and data points 1156 and 1158 represent the measured capacity values at the 800 MHz-900 MHz band and the 1800 MHz-1900 MHz band, respectively, for the present diversity antenna module. In similar fashion, curve 1162 represents capacity at SNR of 15 dB for an ideal single antenna arrangement. Curve 1164 represents simulated capacity and data points 1166 and 1168 represent the measured capacity values at the 800 MHz-900 MHz band and the 1800 MHz-1900 MHz band, respectively, for the ideal single antenna arrangement.

Figure 12:
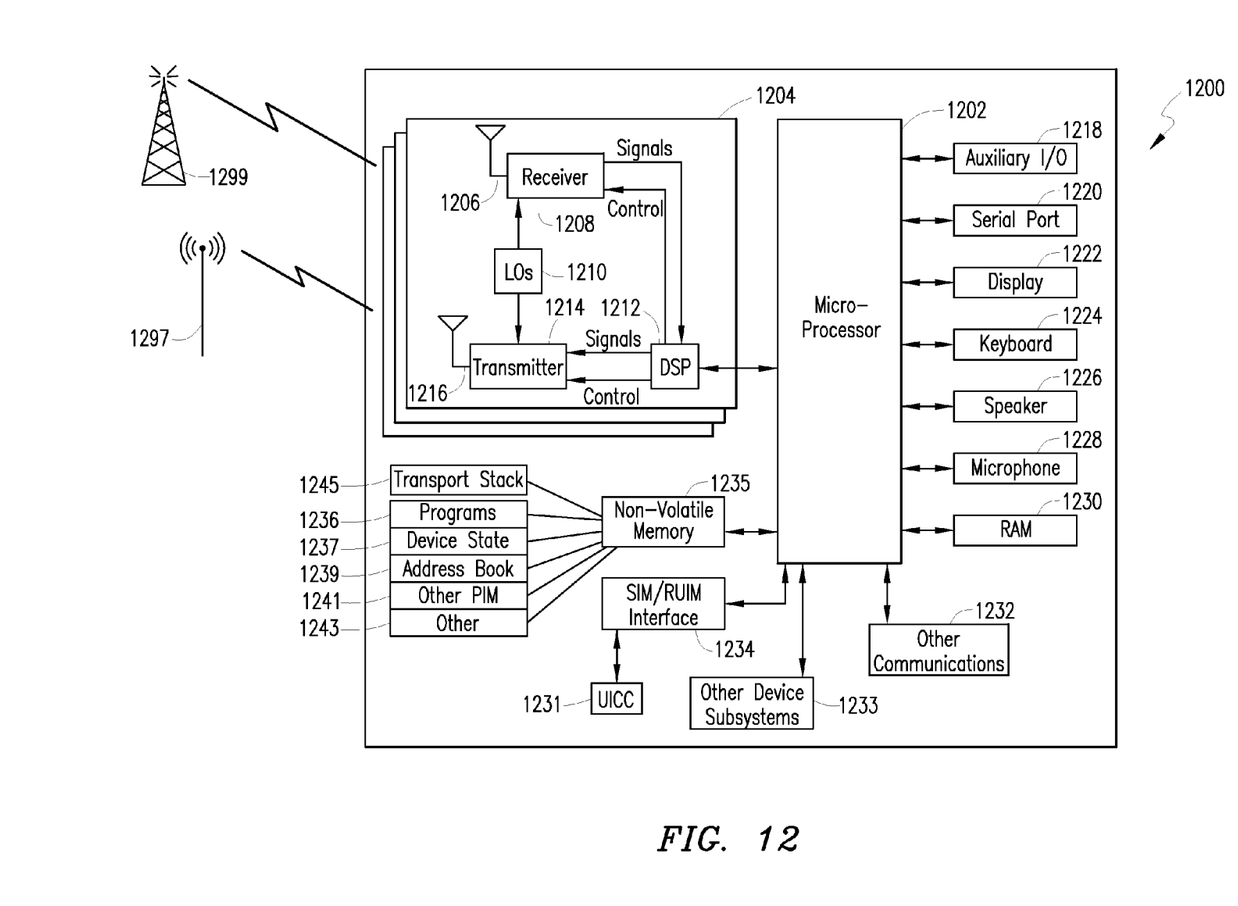
FIG. 12 depicts a block diagram of an example mobile communications device according to one embodiment of the present patent disclosure.

Referring now to FIG. 12, depicted therein is a block diagram of an example mobile communications device (MCD) 1200 having a multi-band diversity antenna module according to one embodiment of the present patent disclosure. Those skilled in the art will recognize that the mobile communications device shown in FIG. 12 can be a more elaborate exemplary implementation of the UE device 100 shown in FIG. 1. A microprocessor 1202 providing for the overall control of MCD 1200 is operably coupled to a multi-mode communication subsystem 1204, which includes appropriate receivers 1208 and transmitters 1214 as well as associated components such as antenna elements 1206, 1216 that can be representative or illustrative of a multi-channel diversity antenna module embodiment described hereinabove. It will be recognized that appropriate GPS receiver circuitry may also be provided as part of the communication subsystem in one implementation. In addition, multi-mode communication subsystem 1204 may include one or more local oscillator (LO) modules 1210 and processing modules such as digital signal processors (DSP) 1212, for operating with multiple access technologies in different bands. As will be apparent to those skilled in the field of communications, the particular design of the communication module 1204 may be dependent upon the communications network(s) with which the device is intended to operate, e.g., as exemplified by infrastructure elements 1297 and 1299.

Microprocessor 1202 also interfaces with further device subsystems such as auxiliary input/output (I/O) 1218, serial port 1220, display 1222, keyboard 1224, speaker 1226, microphone 1228, random access memory (RAM) 1230, other communications facilities 1232, which may include, for example, a short-range communications subsystem, and any other device subsystems generally labeled as reference numeral 1233. To support access as well as authentication and key generation, a SIM/USIM interface 1234 (also generalized as a Removable User Identity Module (RUIM) interface) is also provided in communication with the microprocessor 1202 and a UICC 1231 having suitable SIM/USIM applications.

Operating system software and other system software may be embodied in a persistent storage module 1235 (i.e., non-volatile storage) which may be implemented using Flash memory or another appropriate memory. In one implementation, persistent storage module 1235 may be segregated into different areas, e.g., transport stack 1245, storage area for computer programs 1236, as well as data storage regions such as device state 1237, address book 1239, other personal information manager (PIM) data 1241, and other data storage areas generally labeled as reference numeral 1243. Additionally, the persistent memory may include appropriate software/firmware necessary to effectuate multi-mode communications in conjunction with one or more subsystems set forth herein under control of the microprocessor 1202.

It should be recognized that at least some of the various arrangements set forth in the Figures of the present application may comprise a number of variations and modifications, in hardware, software, firmware, or in any combination, usually in association with a processing system where needed, as components configured to perform specific functions. Accordingly, the arrangements of the Figures should be taken as illustrative rather than limiting with respect to the embodiments of the present patent application. Further, one skilled in the art should recognize that the use of terms such as "first", "second" or "third", etc. in the present disclosure in referencing any elements or features (e.g., the various transceiver or receiver circuits in different bands, or associated structural components or antenna elements), can be somewhat variable and may not necessarily be fixed to a specific element, depending on the particular aspects or embodiments being exemplified.

Based on the foregoing, it should be appreciated that the embodiments herein provide an effective antenna solution covering multiple bands and technologies wherein desirable diversity performance at lower frequency bands as well as higher frequency bands may be gained. Whereas an implementation involving the GSM frequency bands has been exemplified, the teachings of the present disclosure may also be used in CDMA diversity antenna applications or other related 2×2 MIMO applications. Additionally, since the embodiments herein provide various aspects of diversity (that is, spatial diversity (distance between antennas), pattern diversity (difference between antenna aiming directions), and polarization diversity) in single-band as well as multi-band antennas while being amenable to maintaining strict form factor constraints, the antenna solutions of the present disclosure can be particularly advantageous in mobile communications devices, PDAs and other small radio platforms.

It is believed that the operation and construction of the embodiments of the present patent application will be apparent from the Detailed Description set forth above. While the exemplary embodiments shown and described may have been characterized as being preferred, it should be readily understood that various changes and modifications could be made therein without departing from the scope of the present disclosure as set forth in the following claims.

What is claimed is:

1. An antenna apparatus, comprising:
a first radiating element adapted to operate with a first transceiver circuit operating in at least one band, wherein said first radiating element is disposed on a first dielectric supporter that is affixed to a substrate along a first side of said substrate, wherein said substrate comprises a substantially rectangular printed circuit board (PCB) operating as a ground plane with respect to said first and second radiating elements, said first radiating element is provided as a first electrical portion coupled to a second electrical portion, and said first electrical portion is disposed on a horizontal plane of said first dielectric supporter and said second electrical portion is disposed on a vertical plane of said first dielectric supporter; and a second radiating element adapted to operate with a second transceiver circuit operating in at least one band, wherein said second radiating element is disposed on a second dielectric supporter affixed to said substrate along a second side of said substrate, said second side being substantially perpendicular to said first side of said substrate and said first and second radiating elements being substantially perpendicular to each other and being separated from each other by a distance.

2. The antenna apparatus of claim 1, wherein said first transceiver circuit comprises a multi-band transceiver circuit operable with at least one of a radio frequency (RF) band in a range from approximately 800 MHz to 900 MHz and an RF band in a range from approximately 1800 MHz to 1900 MHz.

3. The antenna apparatus of claim 1, wherein said second transceiver circuit comprises a multi-band transceiver circuit operable with at least one of a radio frequency (RF) band in a range from approximately 800 MHz to 900 MHz and an RF band in a range from approximately 1800 MHz to 1900 MHz.

4. The antenna apparatus of claim 1, wherein said first side of said substrate is approximately 55 mm and said second side of said substrate is approximately 95 mm, said substrate having a thickness of approximately 1.5 mm.

5. The antenna apparatus of claim 4, wherein said substrate is comprised of FR4-grade glass-reinforced epoxy laminate material.

6. The antenna apparatus of claim 1, wherein said distance is at least approximately 80 mm.

7. A wireless user equipment (UE) device, comprising:
a first transceiver circuit adapted to operate in at least one band;
a second transceiver circuit adapted to operate in at least one band; and
an antenna module including:
a substrate operating as a ground plane;
a first radiating element adapted to operate with said first transceiver circuit, wherein said first radiating element is disposed on a first dielectric supporter that is affixed to said substrate along a first side, wherein said substrate comprises a substantially rectangular printed circuit board (PCB) operating as a ground plane with respect to said first and second radiating elements, said first radiating element is provided as a first electrical portion coupled to a second electrical portion, and said first electrical portion is disposed on a horizontal plane of said first dielectric supporter and said second electrical portion is disposed on a vertical plane of said first dielectric supporter; and
a second radiating element adapted to operate with said second transceiver circuit, wherein said second radiating element is disposed on a second dielectric supporter affixed to said substrate along a second side, said second side being substantially perpendicular to said first side of said substrate and said first and second radiating elements being substantially perpendicular to each other and being separated from each other by a distance.

8. The wireless UE device of claim 7, wherein said first transceiver circuit comprises a multi-band transceiver circuit operable with at least one of a radio frequency (RF) band in a range from approximately 800 MHz to 900 MHz and an RF band in a range from approximately 1800 MHz to 1900 MHz.

9. The wireless UE device of claim 7, wherein said second transceiver circuit comprises a multi-band transceiver circuit operable with at least one of a radio frequency (RF) band in a range from approximately 800 MHz to 900 MHz and an RF band in a range from approximately 1800 MHz to 1900 MHz.

10. The wireless UE device of claim 7, wherein said first side of said substrate is approximately 55 mm and said second side of said substrate is approximately 95 mm, said substrate having a thickness of approximately 1.5 mm.

11. The wireless UE device of claim 7, wherein each of said first and second dielectric supporter has a thickness of approximately 9 mm.

12. The wireless UE device of claim 7, wherein said distance is at least approximately 80 mm.

13. The wireless UE device of claim 7, wherein the antenna module is an internal antenna module of the wireless UE device.

14. A method for assembling a diversity antenna module, said method comprising:
providing a first radiating element adapted to operate with a first transceiver circuit operating in at least one band, wherein said first radiating element is disposed on a first dielectric supporter affixed to a substrate along a first side, said substrate operable as a ground plane, wherein said substrate comprises a substantially rectangular printed circuit board (PCB) operating as a ground plane with respect to said first and second radiating elements, said first radiating element is provided as a first electrical portion coupled to a second electrical portion, and said first electrical portion is disposed on a horizontal plane of said first dielectric supporter and said second electrical portion is disposed on a vertical plane of said first dielectric supporter; and
providing a second radiating element adapted to operate with a second transceiver circuit operating in at least one band, wherein said second radiating element is disposed on a second dielectric supporter affixed to said substrate along a second side, said second side being substantially perpendicular to said first side of said substrate and said first and second radiating elements being substantially perpendicular to each other and being separated from each other by a distance.

15. The method of claim 14 wherein said second electrical portion includes a feed port for said first radiating element.

16. The method of claim 14 wherein said second radiating element is provided as a first electrical portion coupled to a second electrical portion, and further wherein said first electrical portion is disposed on a horizontal plane of said second dielectric supporter and said second electrical portion is disposed on a vertical plane of said second dielectric supporter.

17. The method of claim 16 wherein said second electrical portion includes a feed port for said second radiating element.

18. The method of claim 14 wherein said substrate further comprises a glass-reinforced epoxy laminate.

19. The method of claim 14 wherein said distance is provided as a variable distance of at least approximately 80 mm.

* * * * *